United States Patent [19]

Koblitz et al.

[11] Patent Number: 5,354,210
[45] Date of Patent: Oct. 11, 1994

[54] SEALANT COMPOSITIONS AND SEALED ELECTRICAL CONNECTORS

[75] Inventors: Francis F. Koblitz, York; Ricky C. Mellinger, Seven Valleys, both of Pa.

[73] Assignee: The Whitaker Corporation, Wilmington, Del.

[21] Appl. No.: 749,373

[22] Filed: Aug. 23, 1991

[51] Int. Cl.$^5$ .................. H01R 13/52; C08L 83/00; C08L 83/04
[52] U.S. Cl. ........................ 439/276; 439/936; 523/173; 524/505; 524/506; 525/479; 525/106; 525/903; 252/570
[58] Field of Search ........... 524/505, 506; 523/173; 439/936, 276; 525/106, 903, 479

[56] References Cited

U.S. PATENT DOCUMENTS

| | | | |
|---|---|---|---|
| Re. 33,354 | 9/1990 | Downey et al. | 428/375 |
| 2,906,810 | 9/1959 | D'Ascoli et al. | 174/87 |
| 3,020,260 | 8/1962 | Nelson | 260/46.5 |
| 3,239,478 | 6/1963 | Harlan, Jr. | 260/27 |
| 3,265,765 | 8/1966 | Holden et al. | 260/876 |
| 3,410,950 | 11/1968 | Freudenberg | 174/84 |
| 3,485,787 | 12/1969 | Haefele et al. | 260/33.6 |
| 3,522,576 | 8/1970 | Cairns | 339/96 |
| 3,536,626 | 10/1970 | D'Ascoli et al. | 252/64 |
| 3,539,708 | 11/1970 | D'Ascoli et al. | 174/87 |
| 3,676,387 | 7/1972 | Lindlof | 260/28.5 B |
| 3,784,952 | 1/1974 | Murray | 339/12 V |
| 3,827,999 | 8/1974 | Crossland | 260/33.6 AQ |
| 3,879,575 | 4/1975 | Dobbin et al. | 174/92 |
| 3,897,129 | 7/1975 | Farrar, Jr. | 339/116 |
| 3,963,677 | 6/1976 | Enger | 524/506 |
| 4,041,103 | 8/1977 | Davison et al. | 260/857 D |
| 4,087,585 | 5/1978 | Schulz | 428/429 |
| 4,101,605 | 7/1978 | Gergen et al. | 268/873 |
| 4,102,716 | 7/1978 | Groves et al. | 156/48 |
| 4,171,998 | 10/1979 | Brauer et al. | 156/48 |
| 4,369,284 | 1/1983 | Chen | 524/476 |
| 4,375,521 | 3/1983 | Arnold | 523/173 |
| 4,425,017 | 1/1984 | Chan | 339/96 |
| 4,451,696 | 5/1984 | Beinhaur | 174/92 |
| 4,595,635 | 6/1986 | Dubrow et al. | 428/447 |
| 4,600,261 | 7/1986 | Debbaut | 339/116 |
| 4,634,207 | 1/1987 | Debbaut | 339/116 |
| 4,643,924 | 2/1987 | Uken et al. | 428/35.7 |
| 4,701,016 | 10/1987 | Gartside, III et al. | 350/96.23 |
| 4,705,340 | 11/1987 | Loose | 439/395 |
| 4,714,801 | 12/1987 | Koblitz et al. | 178/88 |
| 4,716,183 | 12/1987 | Gamarra et al. | 522/80 |
| 4,721,832 | 1/1988 | Toy | 174/87 |
| 4,798,853 | 1/1989 | Handlin, Jr. | 523/173 |
| 4,833,193 | 5/1989 | Sievering | 524/486 |
| 4,864,725 | 9/1989 | Debbaut | 29/871 |
| 4,865,905 | 9/1989 | Uken | 428/220 |
| 4,875,870 | 10/1989 | Hardy et al. | 439/936 |
| 4,883,431 | 11/1989 | Uken et al. | 439/521 |
| 4,909,756 | 3/1990 | Jervis | 439/521 |
| 4,942,270 | 7/1990 | Gamarra | 174/93 |
| 4,970,263 | 11/1990 | Arkles et al. | 525/106 |
| 4,998,894 | 3/1991 | Gronvall | 439/521 |
| 5,004,869 | 4/1991 | Koblitz et al. | 174/84 |
| 5,006,077 | 4/1991 | Loose et al. | 439/409 |
| 5,069,636 | 12/1991 | Shimirak et al. | 439/412 |
| 5,083,940 | 1/1992 | Larson et al. | 439/521 |

FOREIGN PATENT DOCUMENTS

| | | |
|---|---|---|
| 0058022 | 8/1982 | European Pat. Off. . |
| 0074714 | 3/1983 | European Pat. Off. . |
| 0371641 | 6/1990 | European Pat. Off. . |
| 2519018 | 11/1976 | Fed. Rep. of Germany . |
| 2021612 | 12/1979 | United Kingdom . |
| 2195642 | 4/1988 | United Kingdom . |

OTHER PUBLICATIONS

K. B. Wagener and L. P. Engle, Thermally Reversible Polymer Linkages III. Covalently Crosslinked Poly-
(List continued on next page.)

Primary Examiner—Paul R. Michl
Assistant Examiner—Andrew E. C. Merriam

[57] ABSTRACT

Disclosed are moisture and temperature resistant electrical connectors for sealingly connecting transmission means and sealant compositions adapted for use in such connectors, the sealants comprising (i) elastomeric thermoplastic polymer; (ii) extender for said elastomeric thermoplastic polymer; and (iii) cross-linked polymer. The cross-linked polymer is preferably cross-linked in the presence of said elastomeric thermoplastic polymer and is preferably a silicon-based cross-linked polymer.

25 Claims, 6 Drawing Sheets

OTHER PUBLICATIONS (Aslactone), Polymer Preprints, vol. 32, No. 1, Apr. 1991.

C. G. Varelas et al., Microdomain Composition in Two Phase Hydrogels, Polymer Preprints, vol. 32, No. 1, Apr. 1991.

Klein Rodrigues and Wayne L. Mattice, Simulation of Diblock Copolymers as Steric Stabilizers of Polymer Colloids, Polymer Preprints, vol. 32, No. 1, Apr. 1991.

Loon-Seng Tan and Fred E. Arnold, In-Situ Molecular Composites II: Synthesis and Characterization of Poly (Amic Dialkylamides) . . . Polymer Preprints, vol. 32, No. 1, Apr. 1991.

Painter et al., The Formulation of Molecular Composites through Hydrogen Bonding Interactions, Polymer Preprints, vol. 32, No. 1, Apr. 1991.

Quiet Comes to Florida, Outside Plant Magazine, copyright 1990, Practical Communications Inc.

Bruce Malloy et al., Terminal Protection: New Technology Is Beginning to Gel, TE&M, Apr. 15, 1989.

Paul S. Russo, Reversible Polymeric Gels and Related Systems, 191st Meeting of the American Chemical Society, Apr. 13–18, 1986.

D. R. Hansen and Geoff Holden, Thermoplastic Elastomers, Modern Plastics Encyclopedia, 1985–86.

H. F. Giles, Jr., Alloys and Blends, Modern Plastics Encyclopedia, 1985–86.

AMP Instruction Sheet, IS 9616, released Apr. 27, 1990.

AMP Product Information Sheet, Catalog 90-923, issued Apr. 1990.

AMP Instruction Sheet, IS 3206, released Mar. 9, 1990.

AMP Instruction Sheet 3217, released Dec. 20, 1989.

Generic Requires for Terminal Blocks, Bellcore Technical Advisory TA-TSY-000975, Issue 1, Sep. 1989.

Information About High Technology Silicone Materials, Dow Corning Information Sheet, copyright 1983.

Information About Silicone Elastomers, Dow Corning Information Sheet, copyright 1980.

Emerson & Cuming Technical Bulletins 15-2-, publication date unknown.

Emerson and Cuming Technical Bulletin 15-2-3A/-6-82, publication date unknown.

Information About Silicone Elastomers, Dow Corning Information Sheet, publication date unknown.

Information About Electrical/Electronic Materials, Dow Corning Information Sheet, publication date unknown.

US Statutory Invention Registration No. H624, Handlin, Jr. et al.; published Apr. 4, 1989.

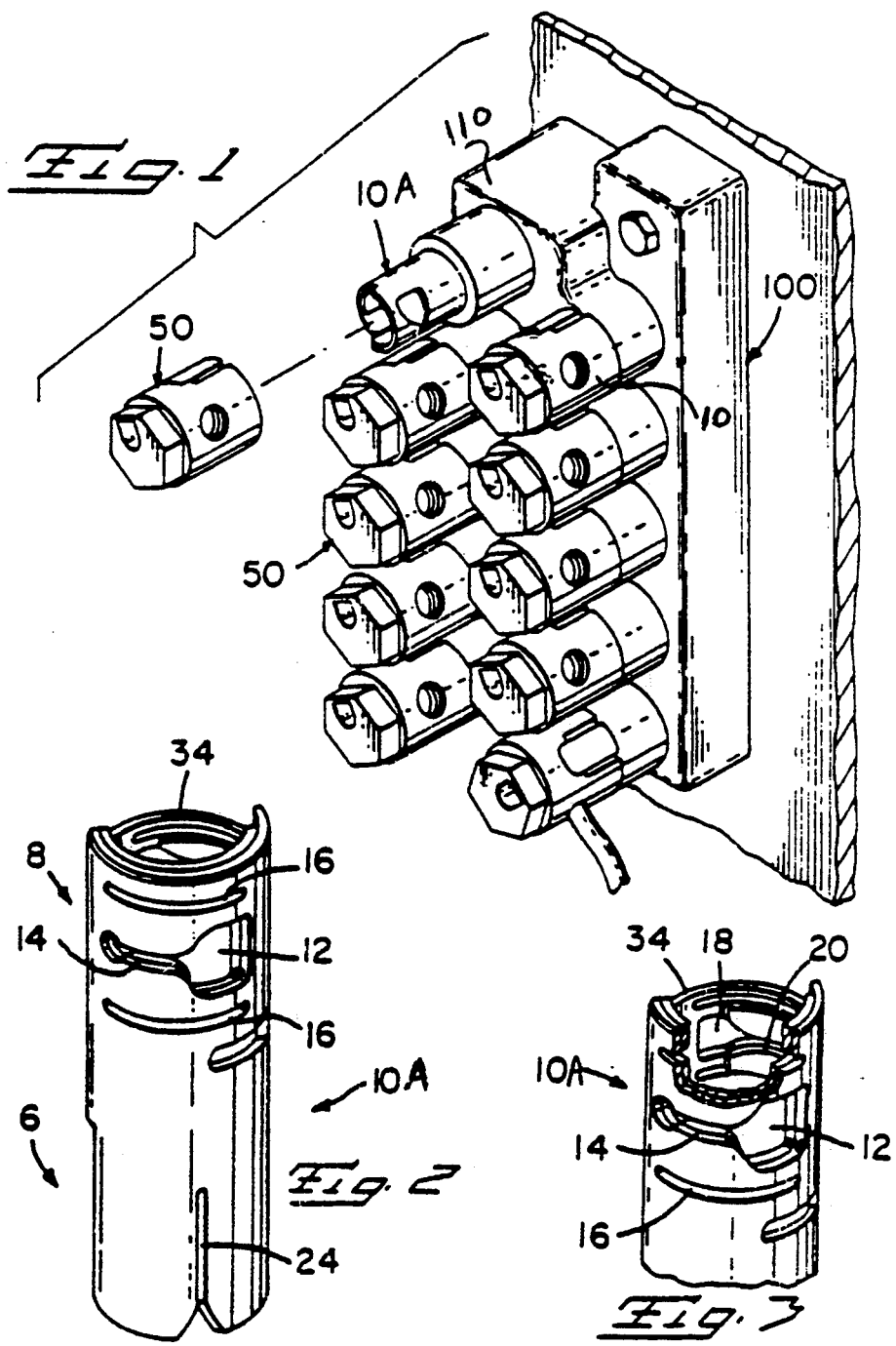

SEALANT COMPOSITIONS AND SEALED ELECTRICAL CONNECTORS

The present invention relates to novel polymer-containing compositions, electrical connectors which include said compositions as functional components, and methods of making said compositions. More particularly, this invention relates to relatively inexpensive, high performance sealant compositions which exhibit flowability at elevated temperatures and excellent elastomeric properties and exudation resistance at room temperature and at moderately elevated temperatures experienced by electrical connectors in service.

Quality and durability are important factors in the design of systems for providing electrical connections, especially such systems utilized in the telecommunications and automotive industries. One criterion affecting the quality of such connections is the extent of effective electrical insulation surrounding the connection. Another important criterion is the maintenance of the connection in a moisture free environment. The invasion of water at the connection site is detrimental in several respects. For example, the "noise," "static" and "crosstalk" which frequently plague telecommunication systems are sometimes caused by signal leakage due to moisture at the connection site. The intrusion of water also has the obvious disadvantage of fostering corrosion and thus negatively impacting on the durability of the connection.

It is also desirable that electrical connections possess the ability to remain in a moisture free, non-corrosive environment when subjected to externally applied shock, vibration and temperature stresses. For example, it is not uncommon that connecting devices are exposed to rough handling during installation and repair. It is also desirable that connectors and the compositions used to seal connections be capable of maintaining high quality electrical contact even when exposed to exogenous vibrations and stresses in heavy duty service. Environmental variations and mechanical stresses, such as temperature cycling and component expansions and contractions, also have an impact upon connection durability.

While noise resistance, durability and moisture resistance in the face of environmental variations and other stresses is desirable in nearly all electrical connecting devices, there are also many commercial and military applications which require that electrical connections be repaired and/or modified in the field. It is highly desirable that such repair and/or modification be accomplished in the shortest period of time and with a minimum of inconvenience to the field craftsperson or technician. Nevertheless, many prior art devices and the sealant compositions used therein possess the disadvantage of being time consuming and inconvenient to repair. For example, U.S. Pat. No. 3,897,129—Ferrar is directed to an apparatus for protecting electrical contacts by covering the contacts with a grease filled container. When repair or replacement of the connection requires reentry to the sealed contact, the container is removed from the contact. Disadvantageously, however, grease remains coated on the contact. This grease must be removed before the repair and/or modification can be affected, an undesirably messy and time-consuming task. Furthermore, the container must be refilled with grease prior to completion of the repair work.

It is also known to encapsulate electrical contacts within a container by means of a two-part liquid composition. when mixed together, the two components react slowly to produce a hard, relatively inflexible material. Before the ingredients set, the mixture is poured into the container where it cures in situ to form a hard, rigid plastic. U.S. Pat. Nos. 4,375,521—Arnold and 4,102,716—Graves disclose such devices. The procedure required by these devices, however, involves the obviously undesirable requirement that the composition be prepared under the conditions existing at the field location, thereby delaying and affecting the quality of the repair and/or modification. Moreover, the physical characteristics of the cured material are such that access to the actual contact is inhibited. Additionally, the chemical curing reaction is controlled by the ambient temperature, proceeding slowly or incompletely at low temperature and being inconveniently rapid at high temperatures.

Applicants have noted a failure of the prior art to provide devices and compositions which overcome the disadvantages described above while maintaining the stringent requirements of noise, moisture and temperature cycling resistance and environmental benignity and stability. Applicants have discovered novel polymeric compositions which satisfy the long-demanded need for materials possessing this set of desirable characteristics.

Certain organic polymers are known to exhibit unique combinations of properties. Among these are block copolymers composed of polymer chains comprised of at least two different types of polymeric units, in which sequences (blocks) of one type of polymeric unit alternate with sequences of another type. If combined with the proper polymeric architecture, the resulting polymeric materials exhibit properties distinct and superior to those of each individual repeating component. For example, it is known that certain performance profiles such as heat resistance, thermoplasticity and elastomeric properties which are not attainable with homopolymers or even with random copolymers are attainable with such block copolymers.

U.S. Pat. No. 3,265,765—Holden et al describes thermoplastic elastomers comprising block copolymers of the A-B-A configuration. Each A block is a glassy or resinous non-elastomeric thermoplastic polymer sequence and each B block is an elastomeric polymer block of a conjugated diene having a glass transition temperature considerably below the glass transition temperature of block A.

Because the block copolymers of the type disclosed in Holden are generally relatively expensive, attempts have been made to provide compositions which require a reduced polymer content without detrimentally affecting the beneficial properties of the polymer. For example, U.S. Patent No. 3,485,787—Haefele describes compositions comprising block copolymers and mineral oil. At least one purpose of the mineral oil is to extend the polymer and thereby reduce the cost of the composition (col. 1, lines 58–64). While the patent indicates that such compositions may contain as little as about 5% mineral oil on the basis of the block copolymer, the patent also indicates that compositions having acceptable properties can only be achieved after certain portions of the block copolymer have been hydrogenated to produce a relatively low degree of unsaturation. The need for this type of special processing is an obvious disadvantage of the disclosed compositions.

The prior art has also attempted to improve upon the properties exhibited by block copolymers. For example, U.S. Pat. No. 4,369,284—Chen discloses thermoplastic elastomeric gelatinous compositions comprising poly(styrene-ethylene-butylene-styrene) tri-block copolymer extended by a plasticizing oil. The patent indicates that as little as about 6 percent of copolymer may be used. However, the resulting composition is said to be extremely soft and highly elastic only if the plasticizing oil has an average molecular weight of 200–700 and the styrene end block to ethylene-butylene center block ratio is 31:69 to 40:60. Furthermore, the requirement to perform under temperature excursion was not contemplated.

In general the prior art has taught that block copolymers of the type described above will exhibit substantial deterioration in physical properties, particularly at high and low temperatures, when large amounts of extender are used. For example, U.S. Pat. No. 3,239,478—Harlan describes block copolymers extended with as much as 67% of a compatible plasticizing oil. This patent recognizes, however, that extensions beyond this point will result in a material with little or no cohesive strength, and that a soft flowable material will result.

U.S. Pat. No. 3,676,387—Lindolf is said to be directed to the disadvantages associated with the Harlan patent. However, the compositions of Lindolf themselves have disadvantages. For example, the compositions described in Lindolf are limited to the use of a particular extending oil. In particular, a non-aromatic paraffinic oil of low volatility with a flash point above about 350° F. and below about 500° F. is required (col. 2, lines 9–15). Even with the use of oils having these specific characteristics, Lindolf recognizes that compositions having greater than about 95% oil are unacceptable since a thixotropic liquid would result (col. 2, lines 23–25).

SUMMARY OF THE INVENTION

Applicants have found that the deficiencies of the prior art can be corrected by sealant compositions which provide an unusual and difficult to obtain combination of properties. In particular, elastomeric materials have been discovered which have an ability to bond, seal and insulate electrical contacts and connector housings, while simultaneously having a highly desirable balance of cohesive strength and adhesive strength; electrical connectors containing such materials offer the possibility of being both effective and reusable. Applicants have found that the adhesive strength of such compositions provides a strong temperature and water-resistant seal while the cohesive strength of the composition ensures that the composition will remain in the connector when terminated wires or test probes are removed. Furthermore, the substantial elastic memory and self-bonding of the present compositions result in substantially no voids being left in a mass of the composition when the wire or test probe is removed. Connectors containing the compositions are environmentally protected and immediately ready for reuse. Thus, applicants have discovered compositions and connectors which eliminate or substantially reduce the problems and disadvantages associated with the above-noted prior art materials and devices.

The present compositions preferably comprise a minor proportion by weight of a polymer composite comprising organic elastomeric thermoplastic polymer and silicone elastomer polymer, and a major proportion by weight of extending agent for the polymers. The type and proportions of said polymer composite and said extending agent are preferably selected to provide the composition with: substantial elastic memory under ambient and moderately elevated temperature conditions; melt processability at substantially elevated temperatures; a high degree of resistance to penetration and permeation by aqueous media; substantially no stratification and/or component separation during temperature cycling; an ability to bond to solid objects inserted into the composition; high cohesive strength; and high adhesive strength to juxtaposed connector members. While the present compositions have particular use as and will frequently be described in connection with sealants for electrical connectors, it will be appreciated that the use of such compositions is not so limited and that numerous other sealing and assembly applications are possible.

According to one important aspect of the present invention, an especially beneficial combination of properties is provided by compositions in which one precursor of the polymer composite comprises silicon-based polymer, and even more preferably cross-linkable or cross-linked silicon-based polymer. Applicants have found that compositions according to this aspect of the invention have an exceptional ability to resist temperature excursions from −30° to +80° C. and to prevent spewing or exudation of extender, even at high temperatures (to 80° C.) and even with extender concentrations of up to about 97 percent by weight of the composition.

Applicants have also discovered advantageous methods for preparing compositions in which the precursor polymer is the preferred cross-linkable silicon-based polymer. The present methods preferably require first mixing the organic elastomeric thermoplastic polymer and the extender under time and temperature conditions sufficient to produce an at least partially gelled organic polymer/extender composition, as evidenced by a substantial increase in the viscosity of the mixture. The silicon-based polymer is then preferably added to the at least partially gelled mixture such that at least a portion, and preferably a substantial portion, of the silicon-based polymer is cross-linked in the presence of the gelled organic polymer/extender mixture.

The present invention also provides moisture and temperature resistant electrical connectors for sealingly connecting transmission means. Such connectors include a connector body having a receiving means for accepting and receiving a transmission means and a sealant composition disposed along or adjacent to the receiving means. The preferred connectors also include means for inhibiting migration of the sealant composition from the connector body. According to especially preferred embodiments, the migration-inhibiting means also comprises means for wiping sealant from solid objects, such as said transmission means, upon removal of said objects from the connector body. According to another preferred connector embodiment, the sealant composition disposed along or adjacent to the receiving means of the connector body comprises a sealant composition according to the present invention. Due in large part to the beneficial characteristics and properties of the present sealants, such connectors provide a highly moisture and temperature resistant, readily repairable and/or modifiable electrical connection.

Methods for using the present sealants to establish a moisture resistant, readily repairable connection are also provided.

DESCRIPTION OF THE DRAWINGS

FIG. 1 is a perspective view partially exploded showing an array of silo-type rotary insulation displacement electrical connectors.

FIG. 2 is a perspective view of a connector body.

FIG. 3 is a partially cut away perspective view similar to that of FIG. 2.

DETAILED DESCRIPTION OF PREFERRED EMBODIMENTS

I. THE COMPOSITIONS

Figure 4:
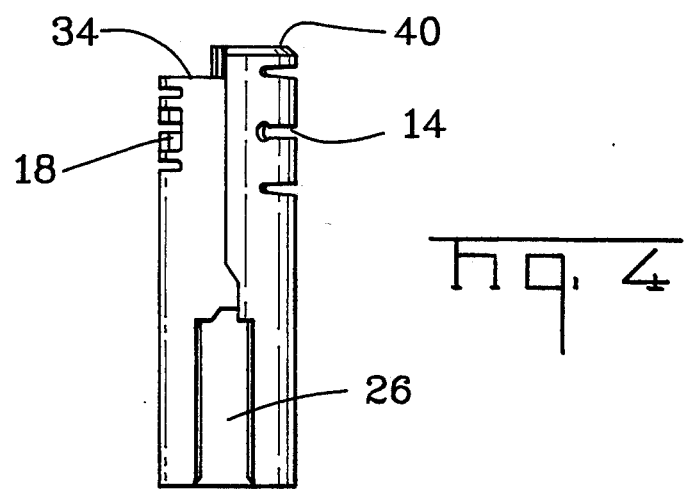
FIG. 4 is a side view of the connector body.

A highly preferred embodiment of the present invention provides compositions comprising extender and a polymer composite, or blend, comprising organic elastomeric thermoplastic polymer and cross-linked silicon-based polymer. The term polymer composite is used herein to designate polymer compositions comprising two or more polymeric compounds, preferably two or more polymeric compounds mixed together mechanically. Thus, the term polymer composite includes within its scope simple microscopically cellular mixtures of two or more polymers, interpenetrating polymer networks, graft copolymers, block copolymers and combinations of these. Thus, it is contemplated that one or more of the above-noted polymeric configurations may be included in the structure of the present polymer composites.

Importantly and desirably, the physical characteristics of the present compositions vary according to, among other conditions, the temperature of the composition. At relatively low temperatures, for example, from about −40° C. to about +80° C., the present compositions are preferably soft, tacky and rubbery. At relatively elevated temperatures, for example above about +125° C. to about +200° C., the compositions are relatively fluid and flowable, thus enabling the material to be more easily handled during the process of incorporating the sealant into the connector.

For temperatures of from about −40° C. to about 80° C., the present compositions preferably exhibit an elastic memory of at least about 200%, and even more preferably at least about 500%. As the term is used herein, elastic memory refers to the ability of a composition to return to about its original configuration after being subject to the designated extent of elongation. The high degree of elastic memory exhibited by the present compositions provides sealants with a highly advantageous "self-repairing" property. That is, the present sealants will deform to accommodate stress exerted by, for example, the insertion of an electrical wire into a mass of the sealant. Upon removal of the wire and hence the accompanying stress, the exceptional elastic memory of the present compositions causes the mass of sealant to return to substantially its original shape and thereby to substantially fill the void resulting from the removal of the wire. This self repairing quality of the present sealants is one important aspect of the present invention.

For temperatures of from about −40° C. to about +80° C., the present compositions preferably have an adhesive strength of from about 2 g to about 12 g, and even more preferably of from about 5 g to about 12 g. Applicants have found that the adhesive strength of the present sealant compositions is related to the ability of the compositions to provide a sealed electrical connection, and that the use of high adhesive strength compositions will generally produce high quality electrical connections. As the term is used herein, adhesive strength refers to the amount of force, as measured by gram weight under standard gravity conditions, required to remove an 18½ gauge PVC covered electrical wire from a mass of sealant contained in a standard terminal block silo. The measurement of adhesive strength is preferably made by inserting about ¼ inch of the PVC covered wire into the sealant-filled terminal block silo and measuring the amount of force required to remove same. As used herein, the term standard terminal block silo refers to a substantially cylindrical connector housing having a height of about 11 mm, an inner diameter of about 14 mm, and a free volume of about 1.6 ml, with a substantially circular access opening of about 5 mm diameter in a sidewall thereof.

The excellent ability of the present compositions to effectively seal electrical connections is also due, at least in part, to the combination of high elastic memory and high adhesive strength exhibited by the compositions disclosed herein. In particular, the high wetting and conformability and elastic memory of the present compositions result in a material which strongly captivates objects, such as electrical wires, inserted into a mass thereof. This feature, along with the high insulation resistance and the strong tendency of the preset compositions to adhere to such objects, produce an effective and long-lived isolation of the electrical connections from the surrounding environment.

The present compositions also preferably have a high cohesive strength. For the purposes of convenience and illustration, cohesive strength is measured herein by determining the gram weight of sealant which is removed from a standard connector silo when an 18½ gauge PVC covered steel electrical wire is removed from a mass of sealant contained in a standard terminal block silo. The measurement of cohesive strength is preferably made by inserting about ¼ inch of the PVC covered wire into a standard sealant-filled terminal block silo and measuring the amount of sealant which is removed from the silo when the wire is removed. The cohesive strength is therefore used herein to refer to the tendency of sealant to remain as a unit mass in the connector silo when the 18½ gauge PVC covered electrical wire is withdrawn, as will typically occur during repair and/or replacement of electrical connectors. For temperatures of from about −40° C. to about +80° C., the present compositions preferably have a cohesive strength as measured by sealant removal of no greater than about 0.2 g, and even more preferably no greater than about 0.04 g.

Another important aspect of certain embodiments of the present invention resides in sealant compositions having both high adhesive strength and high cohesive strength. In particular, it will be generally understood by those skilled in the art that a sealant composition possessing one but not the other of these characteristics will not fully satisfy the objects of the present invention. For example, the use in an electrical connector of a sealant which is high in adhesive strength but low in cohesive strength will result in a large amount of sealant being withdrawn from the connection site during repair or replacement of the connection. On the other hand, the use in an electrical connector of a sealant which possesses high cohesive strength but low adhesion properties will likely produce a poor quality electrical connection seal. Accordingly, the present sealant compositions preferably have an adhesive strength of from about 2 g to about 12 g and a cohesive strength as measured by removal weight of from about 0 g to about 0.2 g at temperatures of about −40° C. to about +80° C. Even more preferably, the present compositions have an adhesive strength of from about 5 g to about 12 g and a cohesive strength of from about 0 g to about 0.02 g at temperatures of from about −30° C. to about +60° C.

Although applicants do not wish to be necessarily bound by or limited to any particular theory, it is believed that the ability of the preferred compositions to exhibit the above-noted combination of beneficial properties is due, at least in part, to the physical and chemical relationship between the components of the present composition. In particular, it is contemplated that the organic elastomeric thermoplastic polymer and the cross-linkable or cross-linked silicon-based polymer component of the present invention comprise an interpenetrating polymer network (IPN). It is believed that the presence of such a polymer network, especially in the presence of optional inorganic gellants, maintains the extender portion of the present compositions in a highly stable dispersed, colloidal, gelled and/or fused state in which exudation or spewing of the extender is strongly inhibited. In addition, it is believed that such a configuration contributes to the high cohesive strength of the present compositions.

In certain embodiments of the present invention, the extender hereof may itself include polymer components, as explained more fully hereinafter. It is contemplated that in such embodiments, the extender may participate in and be part of the IPN of the present invention, thereby further enhancing the adhesive strength and exudation resistance of the present compositions.

As those skilled in the art are aware, interpenetrating polymer networks (IPNs) are a special class of polymer blends in which two or more polymers exist in a highly networked structure. As the term is used herein, interpenetrating polymer network refers to true IPNs, apparent IPNs, semi-IPNs, and combinations and hybrids of these. As the term is used herein, a true IPN refers to those polymer networks in which two or more polymer systems are cross-linked to themselves but not to each other. In such a network, the distinct polymer systems form networks that interpenetrate each other. As the term is used herein, a semi-IPN refers to those polymer networks in which one polymer system exists in an uncross-linked state while a second polymer system is cross-linked to itself. The term apparent IPN refers to co-continuous interpenetrating phases in which none of the polymers is chemically cross-linked but which is nevertheless stabilized by physical polymer cross-links which may be provided, for example, by the styrene end blocks of styrene-ethylene-butylene-styrene block copolymers. As explained more fully hereinafter, it is believed that the preferred polymer composites of the present invention are believed to comprise a polymer network structure having characteristics of both apparent IPNs and semi-IPNS. Additionally, the preferred polymer composite properties may be enhanced by inorganic network formers such as fumed silica.

It is contemplated that the preferred IPNs of the present invention may be formed using a variety of techniques and all such techniques are within the scope of the present invention. It is preferred, however, that the network structure be provided by compositions comprising cross-linked polymer in which at least a portion, and preferably at least a major proportion, of the cross-links are formed in the presence of the elastomeric thermoplastic polymer. The preferred methods of forming the present sealant compositions are disclosed more fully hereinafter.

While the mechanisms which create the observed properties and characteristics of the present compositions are not to be construed as fully explained by present technology, it is believed that the preferred embodiments of the present invention comprise compositions in the form of a thermally reversible polymeric gel. In particular, the present compositions exhibit characteristics which are sometimes associated with thermally reversible polymeric gels. For example, reversible polymeric gels are elastomeric and non-flowable under certain conditions but are converted to a liquid-like, flowable state when the condition of the gel is altered, for example, by increasing temperature. Thus, it is believed that the present compositions, especially when the components are in the preferred ranges described below, are in the form of a reversible polymeric gel in which the extender is contained as a colloidal dispersion or solution of liquid in a polymer composite comprising thermoplastic elastomer and cross-linked polymer.

A. Elastomeric Thermoplastic Polymer

As the term is used herein, organic thermoplastic elastomers are those organic polymers which possess, or which may be plasticized to possess, elastomeric properties under a first set of temperature conditions and which are flowable under a second set of temperature conditions. It is generally preferred that the present elastoplastic polymers are elastomeric at temperatures of from about −40° C. to about +125° C., and that the polymers become flowable at temperatures of from about +150° C. to about +200° C. It is generally preferred that at ambient temperatures the thermoplastic elastomer used in the present polymer composites is sufficiently rigid to retain its general shape and dimension and sufficiently flexible to exhibit substantial recovery upon stretching. As used herein, the term organic polymer refers to polymeric materials in which at least a portion of the polymer backbone is comprised of carbon atoms.

The elastomeric thermoplastic polymer of the present invention preferably comprises organic block copolymers. Numerous block copolymers exhibiting elastoplastic properties are known, readily available and within the broad scope of the present invention.

The block copolymers used in the present polymer composites preferably contain at least one elastomeric block and one non-elastomeric block. Such block copolymers are referred to generally as A-B block copolymers wherein A represents a block of non-elastomeric polymer and B represents a block of elastomeric polymer connected thereto. As the terms are used herein, a block of elastomeric polymer refers to a polymer which can be stretched at about room temperature to at least twice its original length and, after having been stretched and the stress removed, returns with force to approximately its original length in a short time period. In contrast, non-elastomeric blocks according to the present invention do not exhibit this characteristic.

The elastomeric B blocks of the present block copolymers are preferably selected from the group consisting of non-aromatic polyolefins, polyesters, polyethers and combinations of these, with non-aromatic polyolefins being preferred. Polyolefins formed from conjugated dienes, such as polybutadiene and isoprene, and the partially or fully hydrogenated forms thereof, such as polyethylene, polybutene and combinations thereof, are especially preferred. It is contemplated that block copolymers having a large variety of geometrical structures are adaptable for use according to the present invention, since the elastoplastic characteristics are believed not to depend on any specific geometrical structure, but rather upon the chemical constitution of each of the polymer blocks. Thus, block copolymers having linear, radial or branch structures are generally within the scope of the present invention.

The non-elastomeric A blocks are preferably selected from the group consisting of poly (alkenyl arenes), polyurethanes and combinations of these, with poly (alkenyl arenes) being preferred. The non-elastomeric A blocks may comprise homopolymers or copolymers but preferably are homopolymers prepared from alkenyl arenes, such as styrene, methyl styrene, vinyl xylene, ethylene vinyl xylene, isopropyl styrene, vinyl naphthalene and the like, with monoalkenyl monocyclic arenes, such as styrenes, being preferred.

Especially preferred block copolymers are tri-block copolymers having the general configuration A-B-A wherein the polymer contains about two A blocks for each B block. It is especially preferred that each A block is "hard" crystalline, semi-crystalline or glassy polymer end block segment, such as polystyrene and that B is a "soft" elastomeric polymer center block segment, preferably comprised of a non-aromatic polyolefin, such as polyethylene, polybutylene and/or combinations of these. The non-aromatic polyolefin portions of such tri-block copolymers are generally incompatible with the polystyrene portions and form a two-phase system consisting of sub-micron domains of glassy polystyrene interconnected by flexible non-aromatic polyolefin chains. The physical elastomeric network structure of such tri-block copolymers is reversible, and heating the polymer above the polystyrene glass transition temperature will temporarily disrupt the structure, which can be restored by lowering the temperature.

Tri-block copolymers as described herein can be prepared according to a number of well-known techniques, including the methods described in U.S. Pat. No. 3,485,787—Haefele, which is incorporated herein by reference.

It is contemplated that the elastomeric thermoplastic polymer of the present invention may also comprise thermoplastic polyurethane elastomers and thermoplastic polyester/polyether elastomers. In general, such polyurethanes are addition polymers obtained from the chemical reactions of isocyanates. Isocyanates commonly used in the formation of polyurethanes are toluene diisocyante, diphenyl methane diisocyanate and polymeric diisocyanates (PMDI), polymers derived from the condensation of aniline with formaldehyde. Polyurethane and polyester/polyether thermoplastic elastomers are alternating block copolymers having segments of the "hard," highly polar or crystallizing material, such as polyurethane, linked by "soft" segments of amorphous materials, such as polyester which are rubber-like at normal temperatures.

The present compositions preferably comprise a minor proportion by weight of organic thermoplastic elastomer. It is especially preferred that the sealants of the present invention comprise less than about ten percent, and even more preferably less than about five percent, by weight of organic thermoplastic elastomer.

B. Cross-linked Polymers

An important aspect of the present invention resides in the provision of a polymer composite which comprises a cross-linked polymer, preferably an inorganic cross-linked polymer, and even more preferably a cross-linked silicon-based polymer. As the term is used herein, inorganic polymer refers to polymers having inorganic elements making up at least a portion of the backbone of the polymer chain. With respect to the preferred silicon-based polymers of the present invention, silicon atoms contribute to the chemically inert and environmentally benign character of the polymer and are present either alone in the backbone or with atoms of oxygen, carbon, nitrogen, etc. in the backbone. Thus, the term silicon-based polymer is used herein to refer to a wide range of silicon containing polymers, including polysilanes, polysiloxanes, polysilalkylenes and polysilarylenes, with polysiloxanes being preferred. Siloxane polymers are commonly referred to as silicone polymers and will frequently be referred to herein as such.

The siloxane type polymers of the present invention preferably have the general structure shown below and may be prepared, for example, by ring opening polymerization of a trimer or a tetramer:

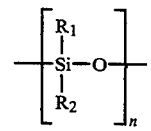

where $R_1$, and $R_2$ are the same or different and are H, OH, alkyl, alkenyl, aryl or aryl-alkyl and n is the degree of polymerization.

The preferred silicon-based polymer of the present invention is at least partially cross-linked. A large variety of cross-linked silicon-based polymers and precursors therefor are available and all such polymers are within the scope of the present invention. For example, cross-linked silicon-based polymers may be formed by reacting functionally terminated siloxane polymer chains with a polyfunctional end linker. It is preferred that the cross-linked polymers of the present invention comprise, preferably in major proportion, cross-linked silicone polymers formed by platinum catalyzed vinyl-addition reactions between hydride- and vinyl-functionalized silicone polymers.

It is especially preferred that the present compositions include silicon-based polymer which is cross-linked in the presence of the thermoplastic elastomer of the present invention. As the term is used herein, a polymer cross-linked in the presence of another polymer refers to chemical cross-linking reactions in which the reactants are intimately intermixed with the other polymer or precursors for the other polymer as the reaction takes place. It is preferred that such intimate mixing during the cross-linking reaction results in the formation of an interpenetrating polymer network.

The present compositions preferably comprise a minor proportion by weight of inorganic cross-linked polymer. It is especially preferred that the sealants of the present invention comprise less than about 35 percent, and even more preferably less than about 25 percent, by weight of inorganic cross-linked polymer.

In highly preferred embodiments, the organic thermoplastic elastomeric polymer and the inorganic cross-linked polymer together comprise less than about 20 percent, and even more preferably less than about 15 percent, by weight of the composition. Such embodiments are not only advantageous from an economic point of view, they posses surprisingly beneficial results. In particular, the excellent combination of properties exhibited by the present compositions is unexpected in view of the relatively low loading of organic and inorganic composite material.

The details of the preferred methods for forming the polymer composites of the present invention, including the cross-linked polymer portion thereof, are described more fully hereinafter.

C. The Extender

The extender of the present invention generally performs one or more of several functions, and accordingly a large number of available extenders are within the scope of the present invention. For example, particular extenders may be chosen to increase the workability, flexibility and/or distensibility of the thermoplastic elastomers of the present invention. As is well known to those skilled in the art, extenders are generally high boiling, chemically and thermally stable organic liquids, low-melting solids or semi-solids.

The present extender preferably affects several properties of the present compositions. In particular, the extender preferably has a beneficial effect on the rheology as well as on the cohesive strength, adhesive strength and flexibility of the present compositions. Furthermore, the extender is preferably present in very large proportions in order to reduce the overall cost of the compositions without negatively affecting the beneficial properties thereof. With the guidance provided herein, it is expected that one skilled in the art will be capable of selecting the extender needed for any particular application without undue experimentation.

An important aspect of the present invention resides in the ability of the extender to fluidize, solvate, gel and/or fuse with the thermoplastic elastomer and/or the inorganic cross-linked polymer. In this regard, it is believed that the extenders of the present invention achieve the desired result through external plasticization of the present compositions. That is, it is believed that the present extenders interact primarily physically and not chemically with the components of the above described polymer composite to reduce the mutual attractive forces between polymer chains in the composite. Accordingly, while the compositions of the present invention may include a certain amount of internal plasticization, such as, for example, copolymerization of the extender with the polymer blend, this is not believed to be necessary or desirable for operation of the present invention. Thus, the extenders of the present invention preferably serve to aid in the processing characteristics of the present compositions to impart flexibility, elongation and toughness to the compositions without reacting chemically therewith. It is generally preferred that the present extenders are relatively viscous materials having a pour point of about 0° C. or less, and even more preferably from about −30° C. to about 0°C.

For the purposes of convenience but not by way of limitation, the extenders of the present invention can generally be classified as either primary or secondary extender. When the polymer-to-extender attraction is strong, the extender has high compatibility with the thermoplastic elastomer and is said to be a primary extender. Where the polymer-to-extender attraction is relatively weak, the extender is of the secondary or "non-solvent" type. Secondary extenders function as spacers between polymer chains but, according to prior processes, could not generally be used in high concentrations because of limited compatibility. This lack of compatibility was frequently manifested in prior materials by tendency of the extender to exude or spew from the composition under conditions of elevated temperature and/or stress. Because of the particular nature of the polymer composites of the present invention, applicants believe that such a tendency to exude or spew, even for high concentrations of secondary extenders, is substantially reduced or eliminated according to the present invention.

The extender of the present invention is preferably selected from the group comprising one or more of the following: aliphatic hydrocarbons, such as aliphatic mineral oil; aromatic hydrocarbons, such as aromatic mineral oil; C1–C6 non-aromatic polyolefins, such as polybutene; ester compounds, such as monomeric phthalate esters, dibasic acid esters, trimellitates, phosphate esters and polyesters; glycol benzoates; citrates; isophthalates; chlorinated hydrocarbons; sebacates and mixtures and combinations of the these.

Applicants have found that compositions with highly preferred properties are obtained when the extender comprises, preferably in major proportion, C1–C4 polyolefin, with C4 polyolefin being preferred and polyisobutene being even more preferred. Applicants have found that extenders comprising such polyolefins, especially extenders comprising at least about 90 percent by weight of low molecular weight highly paraffinic polyisobutylenes, are capable of enhancing the adhesive properties of the sealant, thus contributing to the ability of the composition to seal electrical contacts from corrosive environments. Such materials are available from Amoco Chemical under the trademark INDOPOL H-100 and from Exxon under the trademark VISTANEX LM-MS. With respect to polyisobutylene extender, the term low molecular weight is used herein to refer to such materials having a viscosity average molecular weight (Staudinger) of about 8700 to about 11700. Molecular weights of from about 8700 to about 10000 are especially preferred for applications requiring strong adhesion strength. It is also preferred that the C1–C4 polyolefins have a pour point of about 32° F. or less, and even more preferably from about 5° F. to about 32° F. Such polybutylene extenders are available from Amoco under the designation INDOPOL H-100.

According to other preferred embodiments of the present invention, the extender comprises mineral oil. Without being bound by or limited to any particular theory, it is believed that the presence of mineral oil in the extender contributes to the wetting ability of the composition. The mineral oils of the present invention are preferably relatively high viscosity mineral oils having an SUS at 100° F. of from about 300 to about 600, a specific gravity at about 25° C. of about 0.85 to about 0.89, and a pour point of from about −25° C. to about 0° C. A preferred material is available from the Sonneborn Company, a division of Witco Corp., under the designation KAYDOL. Mineral oil sold under the trade name BRITOL 55T from Malcolm Nicol & Co., Inc., Lindhurst, N.J. is also a preferred mineral oil for use in the extender of the present invention.

Applicants have found that compositions with highly preferred properties are obtained when the extender comprises, preferably in major proportion, a mixture of aliphatic hydrocarbon and C4 polyolefin, with mineral oil being the preferred hydrocarbon and polyisobutene being the preferred C4 polyolefin. Applicants have found that extenders comprising such mixtures, especially extenders comprising at least about 90 percent by weight of such mixtures, are capable of at once providing thermoplastic elastomers with an excellent ability to wet out objects brought into contact with the composition, excellent adhesive strength and excellent cohesive strength. Without being bound by or limited to any particular theory, it is believed that the presence of mineral oil in the extender mixture contributes to the wetting ability of the composition while the polyisobutene contributes to the adhesive and cohesive strength. It is preferred that the extenders have a hydrocarbon oil:polyolefin weight ratio of from about 5:95 to about 95:5, with about 20:80 to about 80:20 being even more preferred. According to a preferred embodiment of the present invention, the extender comprises from about 60 to about 80 parts by weight of mineral oil and from about 40 to about 60 parts by weight of polyisobutene.

It is contemplated that the amount of extender used can vary widely, depending upon such factors as the expected use of the composition, the characteristics of the elastomeric thermoplastic, and the like. An important advantage of the present compositions, however, is the ability to incorporate very large concentrations of extender in the composition without negatively affecting the beneficial properties thereof. Thus, it is highly preferred that the extender:polymer composite weight ratio of the composition is from about 97:3 to about 80:20, and even more preferably from about 95:5 to about 85:15. For the purposes of determining this ratio, the composite weight is the weight of the organic thermoplastic elastomeric polymer together with the inorganic cross-linked polymer.

D. Other Components

It is contemplated that the present sealant compositions may include other components which provide other desirable properties to the sealant composition without detracting from the beneficial characteristics mentioned above.

It is contemplated that corrosion inhibitors, preferably minor amounts thereof, may be included in the present sealant compositions to enhance the integrity of the connection. Such inhibitors are available in wide variety of types and grades and from a wide variety of sources, and all such inhibitors are within the scope of the present invention. High molecular weight synthetic barium sulfonate is a corrosion-inhibiting material available under the trade name NA-SUL BSN from the R. T. Vanderbilt Company in Norwalk, Conn. Chemisorption components are available from PMC Incorporated under the trade designation "COBRATEC 99" and may be incorporated in minor amounts in the present compositions.

Antioxidants may also be incorporated, preferably in minor amounts, in the present sealing compositions. Preferred antioxidants are hydroxyhydrocinnamate based compounds available from Ciba-Geigy Corporation, Hawthorne, N.Y. under the trade designation "IRGANOX." A mixture of IRGANOX 1010 and IRGANOX 1035 is preferred. Other antioxidants are available from the American Cyanamid Company, Wayne, N.J., under the trade designation "CYANOX." Particularly preferred CYANOX compounds are CYANOX 1790 and CYANOX LTDP.

The present compositions may also contain light and heat stabilizing components, preferably in minor amounts. One such stabilizer is available from the American Cyanamid Company under the trade designation "CYASORB." Especially preferred CYASORB materials are CYASORB UV3346.

The present compositions may also contain minor amounts of fungicides and/or antimicrobials. Such materials are available from Morton International Specialty Chemicals Group, Danvers, MA, under the trade designation "VINYZENE" and from Calgon Corporation under the trade designation "METASOL TX-100."

In certain preferred embodiments of the present invention, the sealant compositions may also include a thickening agent such as silica and preferably fumed silica. Silica may also serve to act as a temperature stabilizing agent. Such materials are available as fully hydrophobized surface treated amorphous silicas from Cabot Corporation under the designations "CAB-O-SIL," such as "CAB-O-SIL TS-610" and "CAB-O-SIL TS-530" and from Degussa Corporation under the designation "AEROSIL R-974." Hydrophilic amorphous silicas are available from Cabot Corporation under the trade designation "CAB-O-SIL M-5" and from Degussa Corporation under the trade designation "AEROSIL 200." Incorporation of minor amounts, preferably less than about 8% by weight, of silica into the present compositions tends to favorably control the theology of the sealant and to enhance the cohesive strength thereof.

II. THE CONNECTORS

It is contemplated that the desirable properties of the present compositions will be advantageous in a wide variety of electrical connectors, and all such connectors containing the present compositions are within the scope of the present invention. Moreover, the present invention also provides connectors which eliminate or substantially reduce the tendency of sealant compositions used therewith to migrate or ooze from the connector. Connectors according to such embodiments are adaptable for use with a wide variety of sealant compositions, including those of the type disclosed in the prior art as well as those of the present invention.

The present invention provides moisture proof, temperature resistant and noise resistant electrical connectors for sealingly connecting transmission means therein. The preferred connectors of the present invention comprise a connector body having a terminal means for accepting and electrically connecting to the transmission means inserted appropriately into the connector body and a sealant composition disposed along or adjacent to the terminal means of the connector body. In order to maximize the sealing ability of the connector, the connector body preferably comprises a substantially closed housing or container, and the container is preferably substantially filled with sealant composition. In such embodiments, the container includes access means for allowing entry of the transmission means into the connector body for contact with the terminal means and the sealant composition. The access means preferably comprises said container having an access opening therein.

It will be appreciated by those skilled in the art that, under certain conditions, many of the prior sealant compositions contained in such a container tended to migrate or ooze from the connector body through the access means. While the sealant compositions of the present invention possess properties and characteristics which substantially reduce or eliminate such migration, it is preferred that the present connectors include wiper means substantially covering said access opening for allowing withdrawal of the transmission means from the connecter while retaining said sealant within said housing. The provision of wiper means according to the present invention advantageously facilitates repair and replacement of electrical connections. In particular, the wiper means provides ingress and egress to the transmission means while simultaneously substantially reducing the migration of sealant composition, even relatively flowable and migratory sealants, from the connector.

It is preferred that the wiper means of the present invention comprise a resilient thin membrane adhered to the connector body and covering the access opening. Such resilient membrane also preferably includes an access opening therein for permitting entry of the transmission means into the connector body wherein the dimension between at least two edges of said resilient membrane access opening are less than, and preferably substantially less than, the cross-section of said transmission means. In this way, the edges of such opening provide means for wiping sealant composition from the outer surface of the transmission means when the transmission means is withdrawn from the connector body, as frequently is required during repair operations. According to certain embodiments it is preferred that the smallest dimension of the wiper means access opening is at least about 0.2 times the smallest cross-sectional dimension of the transmission means, and even more preferably about 0.1 times the smallest dimension of the connector body access opening.

The resilient membrane used according to the preferred embodiments of the present invention should provide sufficient flexibility to allow the transmission means to be readily inserted and withdrawn from the connector body while simultaneously possessing sufficient rigidity to overcome any adhesion forces between the sealant composition and the transmission means, thereby wiping sealant means from the transmission means during the withdrawal process. While it is contemplated that a large number of materials in varying thicknesses and sizes are adaptable for use according to the present invention, thin polyurethane films having a thickness of from about 1 mm to about 5 mm are preferred.

It is also contemplated that the particular shape and configuration of the access opening in the wiper means will vary depending upon the type of sealant used and particular applications involved. For example, the access opening may comprise a simple slit in the resilient film, a star pattern of slots or an aperture of circular, square or triangular shape. These and other access openings are all within the scope of the present invention.

A. First Embodiment

A first preferred embodiment of the present invention will now be described in connection with FIGS. 1–12. Connectors of the general type illustrated in these figures are described in U.S. Pat. No. 4,705,340—Luce and 5,006,077, each of which is incorporated herein by reference and assigned to the assignee of the present invention.

Referring now to FIG. 1, a terminal block 100 having a plurality of silo-type rotary insulation displacement electrical connectors 10 is illustrated. The connector housings 10 house a terminal, referred to generally as 10A in FIGS. 2 and 3, substantially closed at the top by mating rotatable cap 50 and at the bottom by, for example, the base 110 of terminal block 100. The terminal 10A is substantially cylindrically-shaped and has a upper insulation displacement portion 8 and a lower insulation displacement portion 6. In operation, the terminal is substantially completely filled with sealant, preferably the sealant composition of the present invention. The terminal parts are preferably stamped from a metal having good electrical conducting qualities. These conductive qualities are desirable because transmission means, preferably two signal-carrying wires, are terminated to the terminals and the signal is carried through the terminal.

Figure 7:
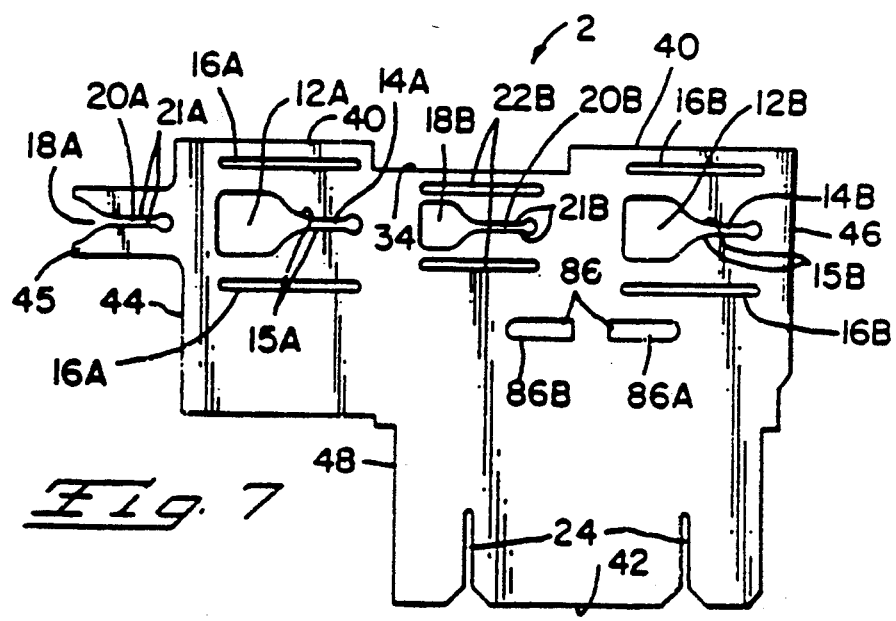
FIG. 7 is a stamped blank prior to being rolled into a connector body.

Referring now to FIG. 7, a preferred method of forming the terminal is disclosed. In particular, the terminal is stamped from a blank 2 having top bearing surfaces 34 and 40, forward surface 44, tab 45 on forward surface 44, bottom surface 42 and a recessed surface 48. Blank 2 includes an inner small wire opening 18A in tab 45, the opening 18A being in transition with an inner small wire receiving slot 20A defined by sheared surfaces 21A. Blank 2 also includes an inner large wire receiving opening 12A in transition with an inner large wire receiving slot 14A defined by sheared surfaces 15A. Strain relief slots 16A are located above and below the large wire opening 12A and large wire slot 14A. The blank 2 includes outer small wire receiving opening 18B in transition with outer small wire receiving slot 20B defined by sheared surfaces 21B, and strain relief slots 22B above and below opening 18B and slot 20B. The blank 2 includes an outer large wire receiving opening 12B in transition with an outer large wire receiving slot 14B defined by sheared surfaces 15B. Strain relief slots 16B are located above and below the opening 12B and slot 14B.

Figure 5:
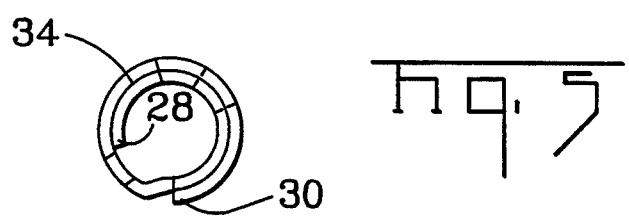
FIG. 5 is a top view of the connector body.

The terminal 10A is formed by rolling the stamped blank of FIG. 7 into cylindrical shape, the cylinder comprising a spiraled double wall thickness as shown in FIG. 5. As best shown in FIGS. 5 and 7, the spiral begins with the end marked 18A. The spiral is then rolled clockwise around the end marked 18A until the outer small wire receiving opening 18B overlaps the inner small wire receiving opening 18A and continues around until the outer large wire receiving opening 12B overlaps the inner large wire receiving opening 12A. As overlapped, the outer large wire strain relief slots 16B also overlap the large strain relief slots 16A. When completely rolled, the terminal is a cylinder having an inner and outer wall of twice the thickness of the metal stamping and having diametrically opposed large and small wire receiving holes, 12 and 18, respectively, as best shown in FIG. 2. The terminal 10A thus includes first access means comprising inner and outer small wire openings 18A and 18B, respectively and second access means comprising large wire inner and outer openings 12A and 12B, respectively. The blank 2 further includes lower insulation displacement slots 24, and cap detention slots 86A and 86B.

Figure 8:
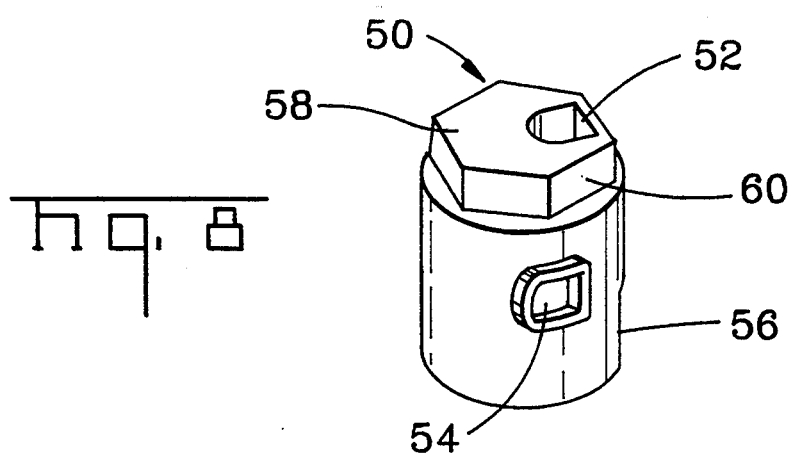
FIG. 8 is a perspective view of the terminating cap.
Figure 11:
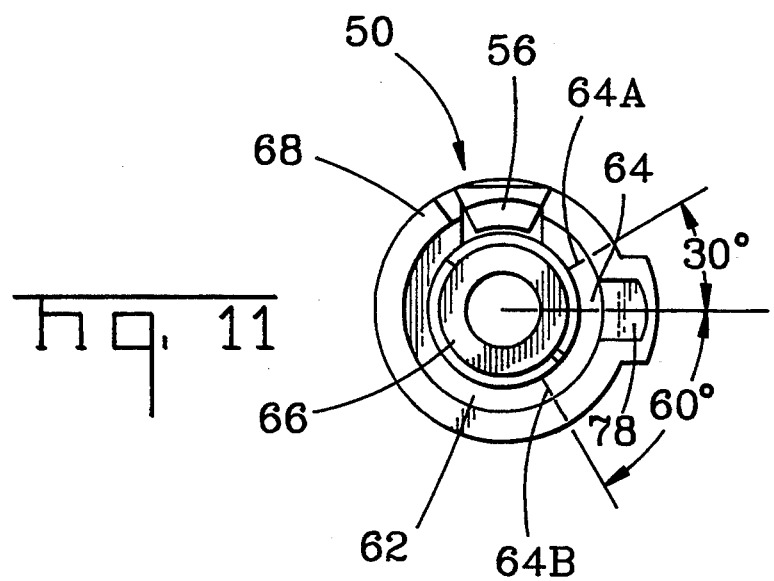
FIG. 11 is a bottom view of the terminating cap.

Referring now to FIGS. 8-11, the connector 10 includes a terminating cap 50, which cooperates with terminal 10A and substantially closes the top end of connector 10. Cap 50 is molded from a dielectric material and includes an outer wall 68 and an inner wall 66 interconnected by a top wall 58, the inner and outer walls 66,68 thereby defining an inner annular channel 62 therebetween. As shown in FIG. 11, cap 50 further comprises rotational lug 64 having surfaces 64A and 64B, detent latch member 56 and small wire receiving channel 78. As shown in FIG. 8, the cap 50 includes hexagonal nut portion 60, continuity test hole 52 and wire entry hole 54. In typical configurations, the hexagonal nut portion 60 rises so as to allow the terminal 10A to accommodate additional sealant material, thereby improving the overall quality of the connection. Wire entry hole 54 comprises large wire entry portion 54A and small wire entry portion 54B, these portions being connected by a frusto-conical transition section defined by surface 76.

Referring now to FIG. 11, it is seen that inner circular wall 66 and outer circular wall 68 of cap 50 define inner channel 62, which is so dimensioned as to be slidably received over the top of terminal 10A; that is, the outer diameter of inner wall 66 is less than the inner diameter of terminal 10A, while the inner diameter of outer wall 68 is greater than the outer diameter of terminal 10A. When cap 50 is received over terminal 10A, wire receiving opening 54 in cap 50 is aligned with large wire receiving opening 12 and opposed small wire receiving opening 18 in terminal 10A. Rotating cap 50 clockwise about a quarter turn aligns wire receiving hole 54 in cap 50 with the large wire receiving slot 14 and diametrically opposed small wire receiving slot 20. In fully assembled form, the wire receiving openings 12 and 18 and the opening 54 in cap 50 individually and together constitute connector body access openings.

Figure 6:
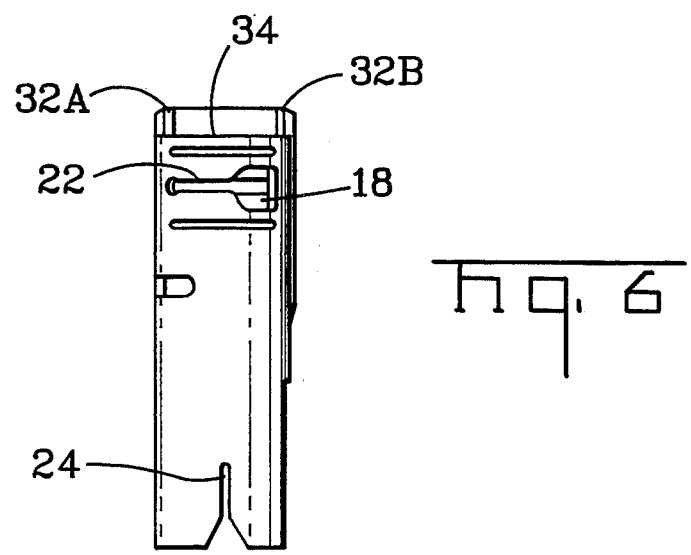
FIG. 6 is a back view of the connector body.

Although the cap 50 and terminal 10A are rotatable with respect to one another, the angle through which the cap 50 may rotate is fixed, because as best shown in FIGS. 5 and 6, the terminal has rotational stops 32A and 32B, and the cap in turn, as shown in FIG. 11, has a rotational stop lug 64, having surfaces 64A and 64B. When the cap 50 is received over terminal 10A such that the wire opening hole 54 in the cap 50 aligns with wire opening holes 12 and 18, surface 64B of lug 64 is against surface 32B of terminal 10A, and when the cap is rotated, the rotation is limited by surface 64A of lug 64 against surface 32A of terminal 10A. Thus, the angle of rotation is defined by the angle of surface 34 as defined by surfaces 32A and 32B, less the included angle of lug 64, as defined by surfaces 64A and 64B, and is the angle required to terminate either the small wire or the large wire in the upper insulation displacement portion 8.

If a small wire is to be terminated, the small wire is placed in hole 54 and extends through sections 54A, 54B and 54C, also passing through large wire receiving opening 12, and then through small wire receiving opening 18 and into channel 78. When the cap is rotated relative to the terminal, the wire is carried in the channel, and the side wall of channel 78 forces the conductor into the small wire terminating slot 20, and the small wire makes electrical and mechanical contact with sheared surfaces 21A and 21B at three points, because the width of at least inner slot 20A is slightly smaller than the diameter of the small wire conductor. The small wire is also rotated into slot 14, and the insulation of the small wire is gripped by slot 14, which acts as a strain relief. Conversely, when a large wire is placed in hole 54, the large wire passes through the large wire receiving opening 12 but then is precluded from entering section 54B, and remains in section 54C, bearing against frusto-conical surface 76. When the cap is rotated relative to the terminal, the large wire is carried within hole 54 and the large wire is forced into the large wire receiving slot 14 and the large wire makes electrical and mechanical contact with sheared surfaces 15A and 15B at three points, because the width of at least inner slot 14A is slightly smaller than the diameter of the large wire conductor.

Figure 8A:
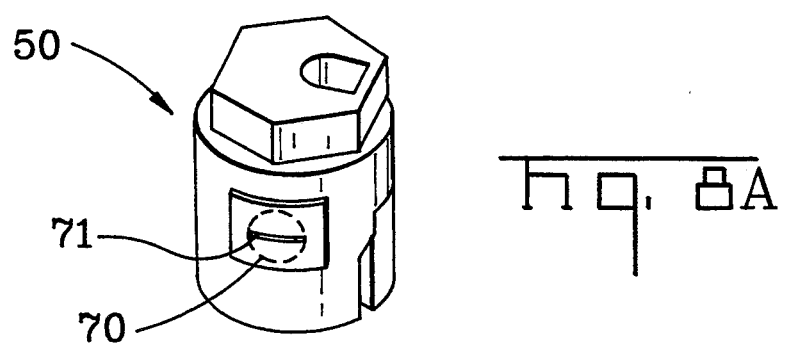
FIG. 8A is a perspective view of the terminating cap showing an embodiment including wiping means.
Figure 9:
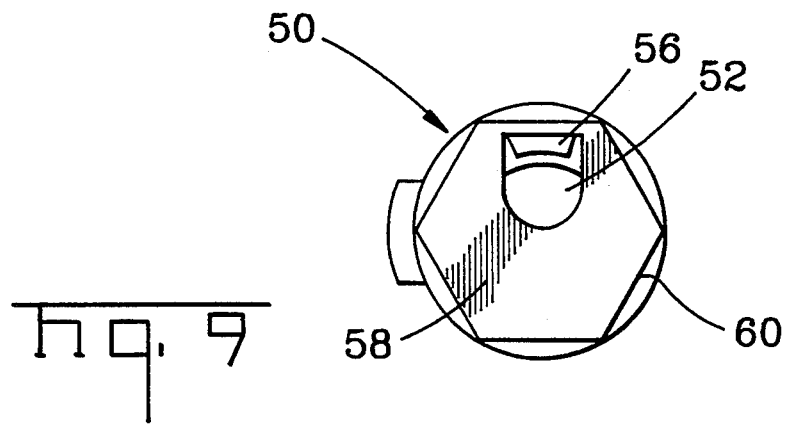
FIG. 9 is a top view of the terminating cap.
Figure 10:
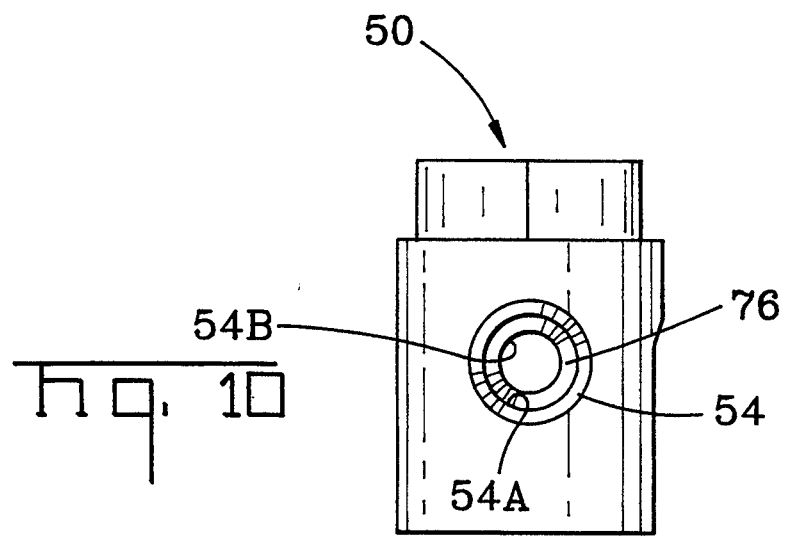
FIG. 10 is a side view of the terminating cap.

According to preferred embodiments of the present invention, one or more of the access openings 12, 18 and 54 are covered by a thin resilient film having a narrow slit or opening therein. As illustrated in FIG. 8A, for example, access opening 54 is covered by a thin resilient film 70 having a narrow slit 71 therein. The wiper means according to such embodiments preferably comprises thin polyurethane tape adhered to the terminal.

Another type of terminal block for interconnecting a pair of wires is disclosed in U.S. Pat. No. 5,006,077, which is incorporated herein by reference and with which the present invention may be used. A tubular dielectric housing has a center post therein defining an annular cavity. A stationary tubular terminal is affixed within the cavity adjacent the center post; a rotatable tubular terminal is disposed within the cavity concentrically around the stationary terminal and in electrical engagement therewith at all times; and a lug-capped tubular actuator is also mounted to the housing and is adapted to be rotated between actuated and unactuated positions to rotate the rotatable terminal. A pair of wire-receiving apertures extend through apertures through the housing wall, through apertures of both terminals and the actuator, and at least into a center post aperture, all aligned in an unactuated state for a wire end to be inserted thereinto. Preferably the terminal block would have a thin resilient slit film over the wire-receiving apertures through the housing wall. Further, the probe opening through the actuator lug could be deepened to provide for sealant to move thereinto upon wire insertion. Upon rotation of the rotatable terminal by the actuator, slot walls of the terminal pierce the wire insulation and engage the wire's conductor. The stationary terminal includes a contact section extending outwardly from the housing including insulation displacement slots for a wire to be inserted thereinto and terminated, for a multiconductor stub cable length to be secured to the enclosure containing a plurality of the terminal blocks, thus defining a cable harness. The two terminal members thus interconnect an appropriate conductor of the stub cable to a wire inserted into the terminal block. A second set of wire-receiving apertures can be utilized to receive a second inserted wire end to be interconnected with the first and with the stub cable connector.

Yet another type of terminal block is disclosed in U.S. patent application Ser. No. 07/708,405 filed May 31, 1991, which is incorporated herein by reference and which is assigned to the assignee hereof. Disclosed therein is a terminal block having a single-piece terminal with connecting sections for two wires to be spliced, which are of the insulation piercing or displacement type which eliminates the need for stripping the insulation from the signal wire conductors. A dielectric housing includes an integrally molded center post within a tubular terminal-receiving housing section, both coextending from a common base section and defining an annular cavity, the housing section providing wire-receiving openings through side walls and into the cavity aligned with an aperture through the center post, enabling insertion of wire ends during splicing. A barrel terminal and an associated lug-capped tubular actuator is then assembled to the housing, with the barrel terminal surrounding the center post within the cavity and having aperatured insulation displacement contact sections which are initially aligned with the wire-receiving openings of the housing and center post, and the actuator also having profiled apertures therethrough extending partially around the circumference and also aligned with the wire-receiving openings of the housing, center post and terminal. The lug extends above the housing upon assembly to be accessible to tooling for rotation thereof to rotate the actuator and the terminal. Again the probe opening the actuator lug can be deep, and a film can cover the wire-receiving openings of the housing side wall. During splicing the wire ends of both wires are inserted into respective openings and through the apertured contact sections until stopped by abutment with corresponding stop surfaces of the housing which then holds the wire ends at two spaced locations, both outside and within the terminal wall; the actuator is then rotated thus rotating the terminal forcing the wire slot edges to pierce the wire insulation of both wires and electrically connect with the conductors therein.

B. Second Embodiment

Figure 12:
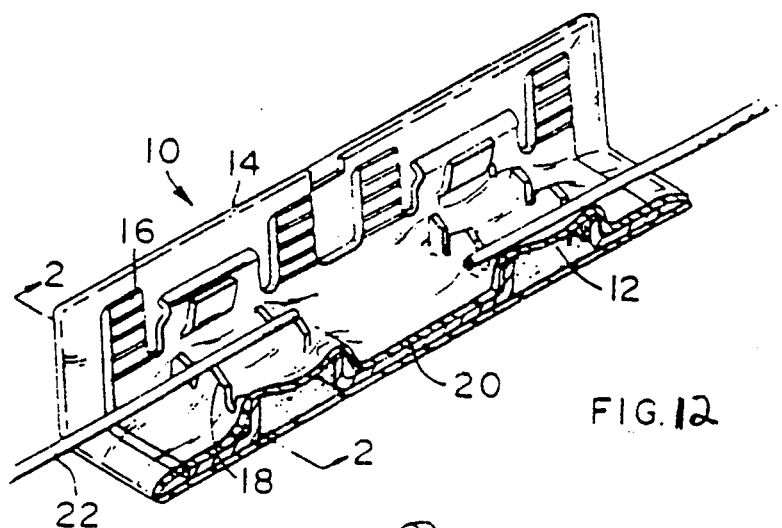
FIG. 12 is a longitudinal sectional perspective view of an uncrimped ferrule type pre-insulated crimpable insulation displacement connector having sealant therein.
Figure 13:
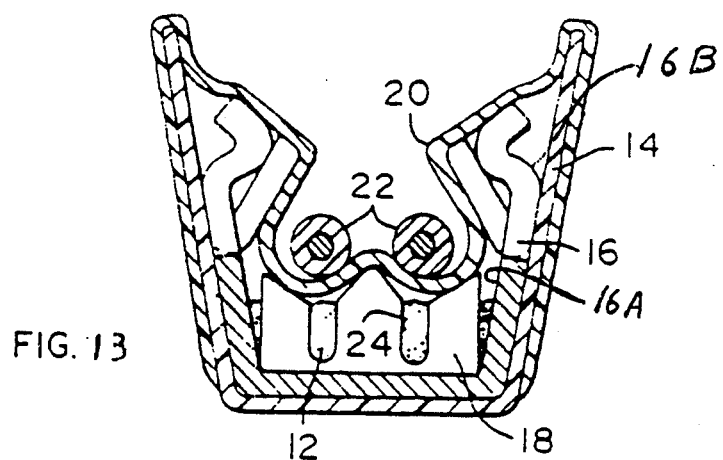
FIG. 13 is a cross-sectional view taken along line 13—13 of FIG. 1.
Figure 14:
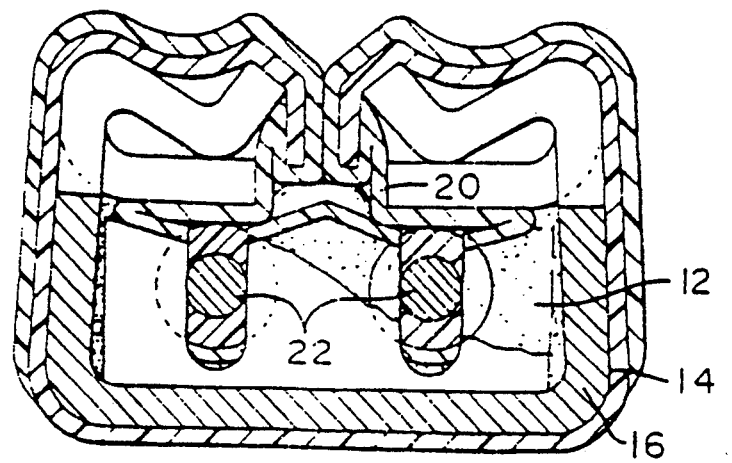
FIG. 14 is a view similar to FIG. 13 but showing the positions of the sealant and the parts after crimping.

While the first embodiment described above provides especially preferred reusable electrical connectors, it is contemplated that electrical connectors according to other configurations are adaptable for use with the present sealant compositions. For example, a second embodiment provides a single use electrical connector, as illustrated in FIGS. 12-14. Connectors of this type are also disclosed in U.S. Pat. No. 3,410,950—Freudenberg, in U.S. Pat. No. 4,714,801—Koblitz et al., and in U.S. Pat. No. 5,004,869—Koblitz et al., each of which is incorporated herein by reference and assigned to the assignee of the present invention.

With particular reference now to FIGS. 12-14, a connector comprising a connector 10 having transmission terminating means 16 is disclosed. The connector is comprised of an outer insulating film 14, an open U-type metal terminal 16 having a plurality of wire-receiving projections 18 extending from inner surface 16A of terminal 16. Sealing material 12, and preferably the sealing composition of the present invention, is dispensed into the connector body 10 and in this particular embodiment it is deposited on the terminal 16, particularly in the areas of projections 18. Connector 10 further has an inner insulating film layer 20 therein which extends over the sealant 12 and projections 18. Film layer 20 is sealed, preferably by means of heat, to the sides of the terminal 16 thus encasing the sealant material.

In using the connector 10, means for transmitting electrical current or signals, such as wires 22, are inserted from opposite ends of the connector 10 and disposed in the area of projections 18. As is shown in FIGS. 12 and 13, the wires 22 lie on top of the inner film layer 20. FIG. 14 shows a cross-section of the crimped connector 10. Crimping of connector 10 generally requires exertion of force on the side walls 16B of the terminal 16 sufficient to deform the terminal into a position similar to the one shown in FIG. 14, thereby forcing the wires 22 into receiving slots 24 of projections 18. Slots 24 are narrower than the diameter of the conductors within wires 22 for side edges of slots 24 to pierce the insulation surrounding the conductors to establish electrical connections therewith. For the purpose of convenience, the force required to produce such a deformation is referred to herein as the normal crimping force. As will be understood by those skilled in the art, the magnitude of this force will vary somewhat depending upon several factors, including connector design and size. During the crimping of the connector 10, wires 22 rupture the film layer as they are forced into receiving slots 24 of projection 18. As a result of the pressure exerted by the normal crimping force, sealant 12 of the present invention is deformed as it is forced through the breach in the film layer 20 and surrounds the intersections of the wires and the projection, thereby sealing the immediate contact areas between the wires and the connector.

III. THE METHODS

It is contemplated that, in view of the information contained herein, compositions according to the present invention may be readily prepared using known techniques. Nevertheless, it is preferred that the present compositions be prepared according to the methods described herein in order to obtain compositions well adapted for use as sealants.

The methods of the present invention generally comprise the step of providing a solution, dispersion and/or emulsion of the elastomeric thermoplastic polymer in the extender, and raising said solution, dispersion or emulsion to at least about the gelation initiation temperature of the polymer/extender mixture, and even more preferably to at least about the fusion temperature of the polymer extender mixture. As is well known to those skilled in the art, the application of heat to polymer/extender mixtures of the type disclosed herein generally causes physical changes in the rheology of the mixture. Without intending to be bound by or limited to any particular theory, it is believed that upon the application of heat to the solutions, dispersions or emulsions of the present invention, the extender portion thereof begins to become solvated in the polymer while fractions of the polymer dissolve in the extender. As additional heat is applied to the composition, continued solvation of the extender and the polymer results in a substantial increase in viscosity and a corresponding loss of composition fluidity. This increase in viscosity and loss of fluidity is generally associated with the onset of the "gelation" of the composition. It will be appreciated by those skilled in the art that as the temperature is raised from about room temperature to about the onset of gelation, the fluid polymer/extender compositions of the present invention may first exhibit an initial decrease in viscosity, followed by the gradual increase in viscosity described above. Upon application of further heat and a further increase in temperature, a peak in viscosity is reached, and thereafter the present compositions exhibit increasing fluidity as the gel becomes liquid-like. For the purposes of convenience, the term "gelation temperature range" is used herein to refer to the range of temperature spanning from about the initial increase in composition viscosity to about the peak in viscosity. Techniques are well known and available to those skilled in the art for determining the onset of gelation of any particular polymer/extender composition. For example, the onset of gelation may be measured using a gelation plate which is heated only at one end, thereby developing a temperature gradient from one end of the plate to the other. When a polymer composite/extender composition is cast onto the plate, the temperature of the plate at the point the composition begins to lose its fluidity is referred to herein as the composition's initial gelation temperature. The temperature at which the composition begins to regain fluidity is referred to herein as the gelation end point. It will be appreciated that these terms are used for the purposes of convenience, but not by way of limitation.

The gelation temperature range of any particular composition is a function of many variables, including the type and relative amounts of extender and polymer material present. It is generally contemplated, however, that gelation of the present compositions will take place at temperatures of from about 125° C. to about 200° C. As additional heat is applied to the composition, fusion of the extender in the polymer occurs and the gel becomes liquid-like. In particular, heating of the present compositions sufficiently beyond the gelation end point causes the extender molecules to become fully incorporated into the matrix of the polymer molecules, and "fusion" begins. As heating continues, the extender becomes substantially integrated into the polymer network. In such a state, the composition is said to be a fused liquid-like composition. According to certain embodiments, the completion of gelation is determined by monitoring the torque required by the mixer and noting the approximate peak thereof.

The present methods also require the important step of incorporating a cross-linkable polymer into the thermoplastic elastomer/extender mixture. It is especially preferred that the incorporating step of the present invention comprise incorporating precursors for said cross-linkable polymer into a fluid composition comprising said thermoplastic elastomer and then cross-linking said polymer precursors in the presence of said thermoplastic elastomer. It is contemplated that the step of incorporating the cross-linked polymer precursors into the composition can occur, before, during and/or after the heating step described above. It is preferred, however, that the polymer precursors be added to the mixture after the initiation of gelation of the organic polymer/extender mixture, more preferably after the gelation end point is reached, and even more preferably after fusion of the organic polymer in the extender.

It is contemplated that the step of cross-linking the precursors in the presence of the thermoplastic elastomer may utilize any one of several well-known techniques, and all such techniques are within the scope of the present invention. For embodiments in which the cross-linkable polymer comprises cross-linkable silicon based polymer, it is preferred that the polymer precursor comprise first and second functionalized silicon-based polymers wherein said first polymer is a hydrosilicon functionalized silicon-based polymer and said second polymer is a vinyl functionalized silicon-based polymer. In such embodiments, the cross-linking step comprises introducing said first and second polymer precursors into the thermoplastic elastomer/extender mixture during the heating thereof. It is also preferred that the cross-linking step comprise introducing a cross-linking catalyst, and preferably a platinum cross-linking catalyst, into the mixture before, during or after the introduction of said polymer precursors.

The examples which follow are illustrative but limiting of the present invention.

IV. EXAMPLES

EXAMPLE 1

A cross-linkable silicone polymer precursor was prepared by intimately mixing at about room temperature a three-component system consisting of an organosiloxane polymer base, a hydrogen siloxane copolymer and a chloroplatinic acid catalyst pre-mixed into the organosiloxane polymer base. The organosiloxane polymer base consisted essentially of a copolymer of units of the formula $RViSiOR_2$, $R_2SiO$ and $CH_3R_2SiO_5$ where R is either methyl or phenyl radicals and Vi is a vinyl radical. The hydrogen siloxane copolymer was of the average general formula:

$$HRCH_3SiO(R_2SiO)_nSiCH_3RH$$

where each R was as above defined and n had an average value such that the viscosity of the hydrogen siloxane copolymer was no more than about 10,000 centistokes at 25° C. The cross-linkable silicone polymer precursors consisted of the product designated by the trademark SYLGARD 527 and was prepared in accordance with the instructions accompanying the product. Such products are described in U.S. Pat. No. 3,020,260—Nelson, which is incorporated herein by reference, and are available from the Dow Corning Corporation.

About 95 parts by weight (PBW) of a extender, about 5 parts by weight of a thermoplastic elastomeric polymer and about 1 part by weight of an antioxidant were introduced at room temperature into a two liter heavy walled mixing beaker. The beaker was provided with a heating source and a three-bladed mixing propeller. The extender was polybutene oil, sold under the trademark INDOPOL H-100 by Amoco, having a kinematic viscosity of about 196–233 centistokes at 100° F., a specific gravity of about 0.88–0.9 at 60° F. and a pour point as measured by ASTM D97 of about 20° F. The thermoplastic elastomer was a poly(styrene-ethylene-butylene-styrene) tri-block copolymer, available from the Shell Development Corporation under the trademark KRATON 1651, having a styrene end block to ethylene and butylene center block ratio of about 33:67. The antioxidant was tetrakis[methylene(3,5-di-tert-butyl-4-hydroxyhydrocinnamate)]methane sold by the Ciba-Geigy Corporation under the trademark IRGANOX 1010.

With constant stirring by the three-bladed propeller at about 750 rpm the temperature of the mixture was raised gradually from about room temperature to about 230° C. over a period of about 80 minutes to produce a relatively homogenous, glutinous composition. Stirring was continued for about an additional 80 minutes as the temperature of the mixture was lowered from about 230° C. to about 160° C. With the mixture temperature at about 160° C., about 10 pbw of the silicone polymer precursor described above was introduced gradually over a two minute period into the glass mixing beaker. The mixture was maintained at about 160° C. and stirring was continued for about an additional 30 minutes, at which point about 0.1 PBW of corrosion inhibitor and about 0.05 parts by weight of a fungicide were added to the mixing beaker. The corrosion inhibitor was benzotriazole supplied under the trademark COBRA-TEC 99 by PMC, Incorporated, and the fungicide was 2-(4-thiazdyl)benzimidazole supplied under the trademark METASOL TK-100 by Calgon Corporation. After continued stirring at about 160° C. for about an additional five minutes, the contents of the mixing beaker were cooled to about room temperature.

A clear, homogenous, well dispersed thermoplastic sealant gel resulted with a viscosity of 296 units (0.1 mm) as measured by the ASTM D217 method for testing cone penetration of lubricating greases as described below.

ASTM D217 is a standard test procedure entitled "Standard Test Methods for Cone Penetration of Lubricating Grease," adopted by the American Society for Testing and Materials (ASTM) and used throughout the materials industry to determine viscosities of lubricating greases. This procedure was used to determine the cone penetration at 25° C. (77° F.) of a sample of the sealant that had received only minimum disturbance in transferring the sample to a grease worker cup or other suitable container. The apparatus used was a penetrometer, which is designated to measure in tenths of a millimeter the depth to which a standard cone penetrates the sample. The penetrometer has an adjustable table to properly position the cone on the surface of the sample prior to releasing the cone. The standard cone used was made of magnesium with a detachable, hardened steel tip having a total weight of 102.5±0.1 g in accordance with specifications of the test. A quantity of the sealant material and the test sample container are brought to a temperature of 25°±0.5° C. in a water or air bath. A sample of the material is transferred to the container and packed to eliminate air pockets. The sample in the container is leveled and placed on the penetrometer table. The apparatus is adjusted so that the tip of the cone just touches the surface of the sample. The cone shaft is then released and allowed to drop for 5.0±0.1 seconds. The amount of penetration is read from an indicator on the apparatus. In accordance with the procedure the values given are the average of three penetration tests per sample.

Additional physical properties of the sealant were measured and are reported in Table I under the column heading "EX 1." Also reported in Table 1 under the column heading "Silicone Sealant" are the properties for an extensively used silicone sealant in current commerce. The resulting test values illustrate the superior appearance, homogeneity (fineness of grind), and creep of the sealants of the present invention.

TABLE I

| Property Measured | EX 1 | Silicone Sealant |
|---|---|---|
| Appearance | Clear Translucent | White Translucent |
| Cone Penetration (ASTM D217) (units are 0.1 mm) | 296 | 200–300 |
| Bleed @ 170° F. 24 hrs. | 0% | 0% |

TABLE I-continued

| Property Measured | EX 1 | Silicone Sealant |
|---|---|---|
| Softening Point | 186° F. | None |
| Fineness of grind (ASTM D1210) (NS) | 8 | 1.5 |
| Slump test @ 170° F., 24 hrs. | 0.1 inch | 0.1 inch |
| Flow 325° F., 45 p.s.i., 3 sec. | 8 g | None |

EXAMPLE 2

About 91 parts by weight (PBW) of an extender, about 4 parts by weight of a thermoplastic elastomeric polymer and about 5 parts by weight of the silicone polymer precursor described in Example 1 were introduced at room temperature into a two liter heavy walled mixing beaker. The beaker was provided with a heating source and a three-bladed mixing propeller. The extender was a mineral oil, sold under the trademark BRITOL 55T by Malcolm Nicol & Co., having a viscosity of about 560 SUS at 100° F., a specific gravity of about 0.864 and a pour point of about 10° F. The thermoplastic elastomer was a poly(styrene-ethylene-butylene-styrene) tri-block copolymer, available from the Shell Development Corporation under the trademark KRATON 1651, having a styrene end block to ethylene and butylene center block ratio of about 33:67.

With constant stirring by the three-bladed propeller at about 750 rpm the temperature of the mixture was raised gradually from about room temperature to about 190° C. over a period of about 120 minutes to produce a relatively homogenous, glutinous composition. Stirring was continued for about an additional 30 minutes as the temperature of the mixture was lowered from about 190° C. to about 160° C. With the mixture temperature at about 160° C., about 5 PBW of the silicone polymer precursor described above was introduced gradually in two minutes into the glass mixing beaker. The mixture was maintained at about 160° C. and stirring was continued for about an additional 30 minutes to produce a sealant composition of the present invention. The resulting composition was subjected to a series of tests to measure the physical properties and performance thereof. The results of these tests are reported in Table II below.

TABLE II

| Property Measured | |
|---|---|
| Appearance | Clear |
| Cone Penetration (ASTM D217) (units are 0.1 mm) | Slightly Translucent |
| Bleed @ 170° F. 24 hrs. | 0 |
| Fineness of grind (ASTM D1210) (NS) | 8 |
| Slump test 170° F., 1 hr. | 0.05 inch |
| Softening point | 260° F. |

EXAMPLE 3

The sealant of Example 2 was then inserted at room temperature into an open electrical connector of the type illustrated in FIGS. 12–14 using a 14 GA. hypodermic needle. The connector was then crimped to form an electrical connection according to standard well known techniques. It was observed that upon crimping, the sealant was deformed so as to extend along the length of the connection and out beyond the end of the terminal, thereby effectively sealing the electrical contacts. It was also unexpectedly observed that the deformed sealant adhered to the connector and wires during and after the crimping operation, and that little or no sealant was removed from the connector by the crimping tool. It was further observed that the sealant remained in contact with the wires even upon flexing thereof, thereby desirably maintaining the integrity of the seal.

EXAMPLE 4

About 92 parts by weight (PBW) of an extender, about 1 PBW of a first thermoplastic elastomeric polymer, about 4 PBW of a second thermoplastic elastomeric polymer, and about 5 PBW of fumed silica were introduced at room temperature into a two liter heavy walled mixing beaker. The beaker was provided with a heating source and a three-bladed mixing propeller. The extender was KAYDOL oil, sold by Witco, having a kinematic viscosity of about 65–70 centistokes at 40° C., a specific gravity of about 0.87–0.89 at 25° C. and a pour point as measured by ASTM D97 of about −18° C. The first thermoplastic elastomer was a poly(styrene-ethylene-butylene-styrene) tri-block copolymer, available from the Shell Development Corporation under the trademark KRATON 1651, having a styrene end block to ethylene and butylene center block ratio of about 33:67. The second thermoplastic elastomer was a low strength diblock copolymer, poly(styrene-ethylene-propylene), sold by Shell Development Corporation under the trademark KRATON G 1701. The fumed silica was a fully hydrophobized 200 sg m/g silica sold under the trademark AEROSIL R-974 by the Degussa Corporation.

With constant stirring by the three-bladed propeller at about 750 rpm the temperature of the mixture was raised gradually from about room temperature to about 190° C. over a period of about 80 minutes to produce a relatively homogenous, glutinous composition. Stirring was continued for about an additional 80 minutes as the temperature of the mixture was lowered from about 190° C. to about 160° C. With the mixture temperature at about 160° C., about 25 PBW of the silicone polymer precursor described above was introduced gradually during a two minute period into the glass mixing beaker. The mixture was maintained at about 160° C. and stirring was continued for about an additional 30 minutes.

After cooling 24 hours at room temperature the contents of the beaker were observed to be a clear, translucent homogenous, well dispersed thermoplastic gel sealant composition having a viscosity at 74° F. of about 266 units (0.1 mm) as measured by the ASTM D217 method described in Example 1.

The physical properties of the sealant composition of this Example were measured and are reported in Table III.

TABLE III

| Property Measured | |
|---|---|
| Appearance | Clear Translucent |
| Cone Penetration (ASTM D217) (units are 0.1 mm) | 266 |
| Bleed 24 hrs. @ 80° C. | 0 |
| Bleed 24 hrs. @ 100° C. | 0 |
| Fineness of grind (ASTM D1210) (NS) | 8 |
| Slump test 80° F., 24 hrs. | 0.05 inch |
| 100° F., 24 hrs. | 0.3 inch |

What is claimed is:

1. A moisture and temperature resistant electrical connector for sealingly connecting transmission means comprising:
   (a) a connector body having a terminal means for accepting and electrically connecting with the transmission means; and
   (b) a sealant composition disposed along or adjacent to said terminal means, said sealant composition having an elastic memory at break of at least about 200%, an adhesive strength of at least about 5 g at temperatures of from about −40° C. to about +80° C., and a cohesive strength of no greater than about 0.2 g at temperatures of from about −40° C. to about +80° C. as measured by removal weight and comprising:
      (i) organic block copolymer having elastomeric properties at about room temperature and thermoplastic properties at above about room temperature, said block copolymer comprising at least one block selected from the group consisting of non-aromatic polyolefins, polyesters, polyethers, poly(alkenyl arenes), polyurethanes and combinations of these;
      (ii) extender for said organic polymer; and
      (iii) cross-linked silicon-based polymer,
   said silicon-based polymer being cross-linked in the presence of said organic polymer, said organic polymer and said silicon-based polymer together comprising less than about 35% by weight of said composition.

2. The connector of claim 1 wherein said extended is selected from the group consisting of aliphatic hydrocarbons; aromatic hydrocarbons; C1–C6 non-aromatic polyolefins; ester compounds; glycol benzoates; citrates; sebacates; trimellitates; isophthalates; chlorinated hydrocarbons; and mixtures and combinations of these.

3. The connector of claim 1 wherein the extender is selected from the group consisting of aliphatic hydrocarbons; aromatic hydrocarbons; C1–C6 non-aromatic polyolefins and mixtures of these.

4. The connector of claim 1 wherein the extender comprises a mixture of mineral oil and polyisobutene.

5. The connector of claim 1 wherein said block copolymer comprises:
   (a) an elastomeric block selected from the group consisting of non-aromatic polyolefins, polyesters, polyethers and combinations of these, and
   (b) a non-elastomeric block selected from the group consisting of poly (alkenyl arenes), polyurethanes and combinations of these.

6. The connector of claim 5 wherein said elastomeric block is non-aromatic polyolefin and said non-elastomeric block is poly (alkenyl arene).

7. The connector of claim 6 wherein said elastomeric block is C1–C4 non-aromatic polyolefin and said non-elastomeric block is polystyrene.

8. The connector of claim 7, wherein said C1–C4 polyolefin is polyethylene-co-polybutylene.

9. The connector of claim 1 wherein the degree of cross-linking of said silicon-based polymer is from about 5 to about 95 percent.

10. The connector of claim 1 wherein said silicon-based polymer comprises polysiloxane.

11. The connector of claim 1 wherein the weight ratio of said silicon-based polymer to said elastomeric thermoplastic polymer is from about 8:1 to about 1:2.

12. The connector of claim 1 wherein said silicon-based polymer and said elastomeric thermoplastic polymer comprise an interpenetrating polymer network.

13. The connector of claim 1 wherein said sealant composition is in the form of a polymer gel.

14. The connector of claim 1 wherein said sealant composition is in the form of a melt processable reversible polymer gel.

15. The connector of claim 1 wherein said extender comprises a mixture of mineral oil and polyisobutene and said extender has a mineral oil:polyisobutene weight ratio of from about 95:5 to about 5:95.

16. The connector of claim 1 wherein said sealant composition further comprises fumed silica.

17. The connector of claim 16 wherein said fumed silica is selected from the group consisting of hydrophobic surface treated amorphous silica, hydrophilic amorphous silica and mixtures of these.

18. The connector of claim 1 wherein said adhesive strength is from about 5 g to 12 g.

19. The connector of claim 1 wherein said cohesive strength is no greater than 0.04 g.

20. The connector of claim 1 wherein said adhesive strength is from about 5 g to about 12 g, and said cohesive strength is from about 0 g to about 0.2 g.

21. A moisture and temperature resistant electrical connector for sealingly connecting transmission means comprising:
(a) a connector body comprising a substantially closed container having:
(i) a terminal means for accepting and electrically connecting with a transmission means; and
(ii) access means for allowing entry of the transmission means into the connector body; and
(b) a sealant composition substantially filling said container and disposed along or adjacent to said terminal means, said sealant composition having an elastic memory at break of at least about 200%, an adhesive strength of from about 5 g to about 12 g at a temperature of from about −40° C. to about +80° C., and a cohesive strength of no greater than about 0.2 g at a temperature of from about −40° C. to about +80° C. as measured by removal weight and comprising:
(i) elastomeric thermoplastic block copolymer, comprising an elastomeric block selected from the group consisting of non-aromatic polyolefins, polyesters, polyethers and combinations of these, and a non-elastomeric block selected from the group consisting of poly (alkenyl arenes), polyurethanes and combinations of these;
(ii) extender for said elastomeric thermoplastic polymer; and
(iii) cross-linked silicon-based polymer, wherein said cross-linked polymer interpenetrates said elastomeric thermoplastic polymer, said elastomeric thermoplastic polymer and said cross-linked polymer together comprising less than about 35% by weight of said composition.

22. The connector of claim 21 wherein said sealant composition has an adhesive strength of from about 5 g to about 12 g, and a cohesive strength of from about 0 g to about 0.02 g at temperatures of from about −40° C. to about +80° C.

23. A method of manufacturing a moisture and temperature resistant electrical connector for sealingly connecting transmission means comprising:
(a) providing a substantially closed connector body having a terminal means for accepting and electrically connecting with the transmission means; and
(b) disposing a sealant composition along or adjacent to said terminal means, said sealant composition being flowable above temperatures of about 80° C., having a cone penetration value of no less than about 100 (0.1 mm) at about room temperature, having an elastic memory at break of at least about 200%, an adhesive strength of from about 5 g to about 12 g at a temperature of from about −40° C. to about +80° C., and a cohesive strength of no greater than about 0.2 g at a temperature of from about −40° C. to about +80° C. as measured by removal weight and comprising:
(i) organic block copolymer having elastomeric properties at about room temperature and thermoplastic properties at above about room temperature, said block copolymer comprising an elastomeric block selected from the group consisting of non-aromatic polyolefins, polyesters, polyethers and combinations of these, and a non-elastomeric block selected from the group consisting of poly (alkenyl arenes), polyurethanes and combinations of these;
(ii) extender for said organic copolymer; and
(iii) cross-linked silicon-based polymer, wherein said cross-linked silicon-based polymer interpenetrates said organic polymer, said organic polymer and said silicon-based polymer together comprising less than about 35% by weight of said composition.

24. The method of claim 23 wherein said sealant composition has a cohesive strength of no greater than about 0.04 g at temperature of from about −40° C. to about +80° C.

25. The method of claim 23 wherein said sealant composition is flowable above temperatures of about 125° C.

* * * * *

UNITED STATES PATENT AND TRADEMARK OFFICE
CERTIFICATE OF CORRECTION

PATENT NO. : 5,354,210

DATED : October 11, 1994

INVENTOR(S) : Koblitz et al.

It is certified that error appears in the above-identified patent and that said Letters Patent is hereby corrected as shown below:

In claim 2, column 26, line 37, delete "extended" and replace with --extender--.

Signed and Sealed this

Twentieth Day of June, 1995

*Attest:*

BRUCE LEHMAN

*Attesting Officer*     *Commissioner of Patents and Trademarks*